Sept. 30, 1969  D. YEHIELY  3,470,025
THIRD-ELECTRODE RECHARGEABLE ALKALINE BATTERY CELLS
AND ASSOCIATED BATTERY CIRCUITS
Original Filed June 8, 1964  3 Sheets-Sheet 1
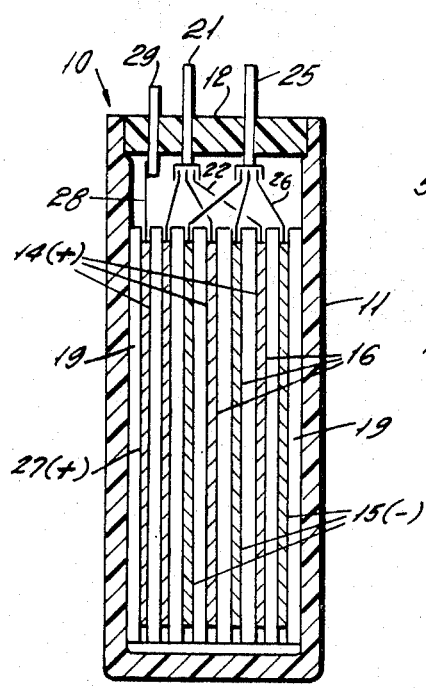
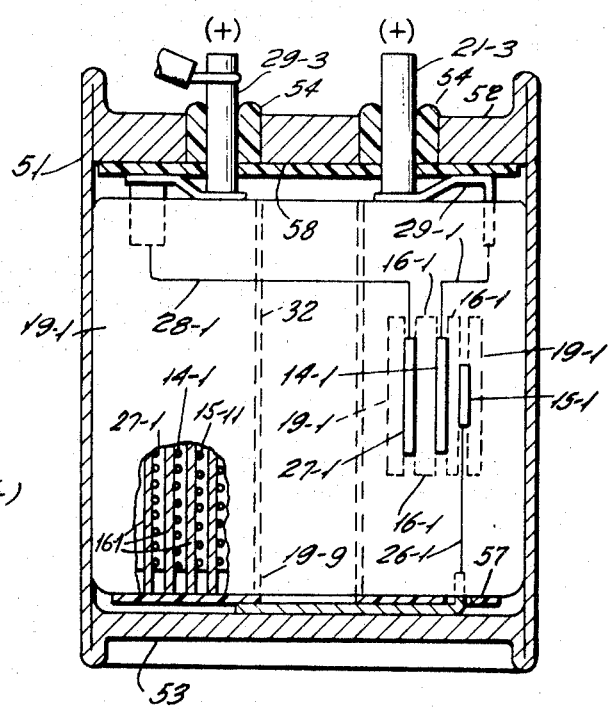
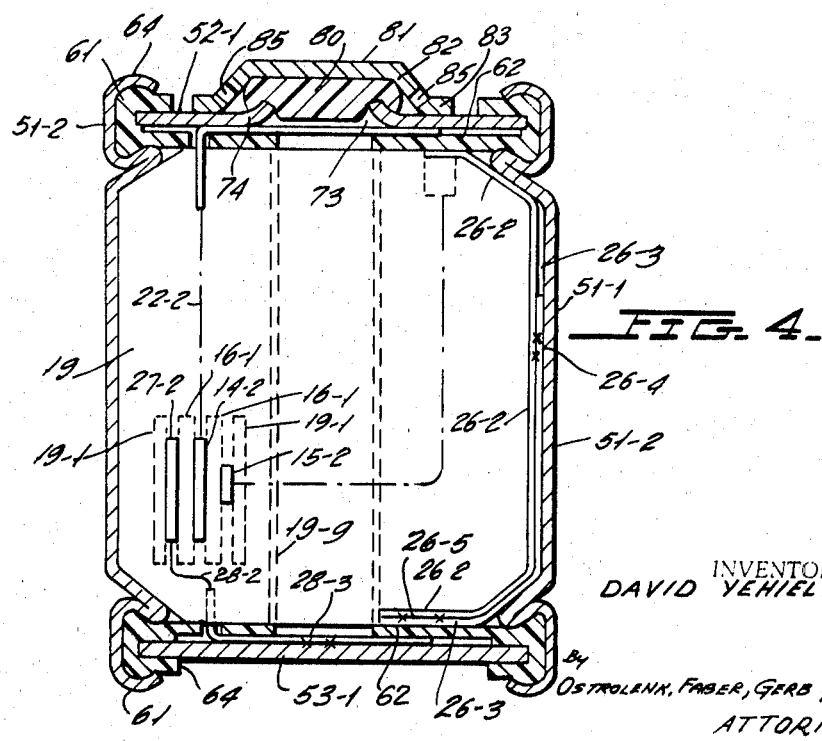
INVENTOR.
DAVID YEHIELY
BY Ostrolenk, Faber, Gerb & Soffen
ATTORNEYS

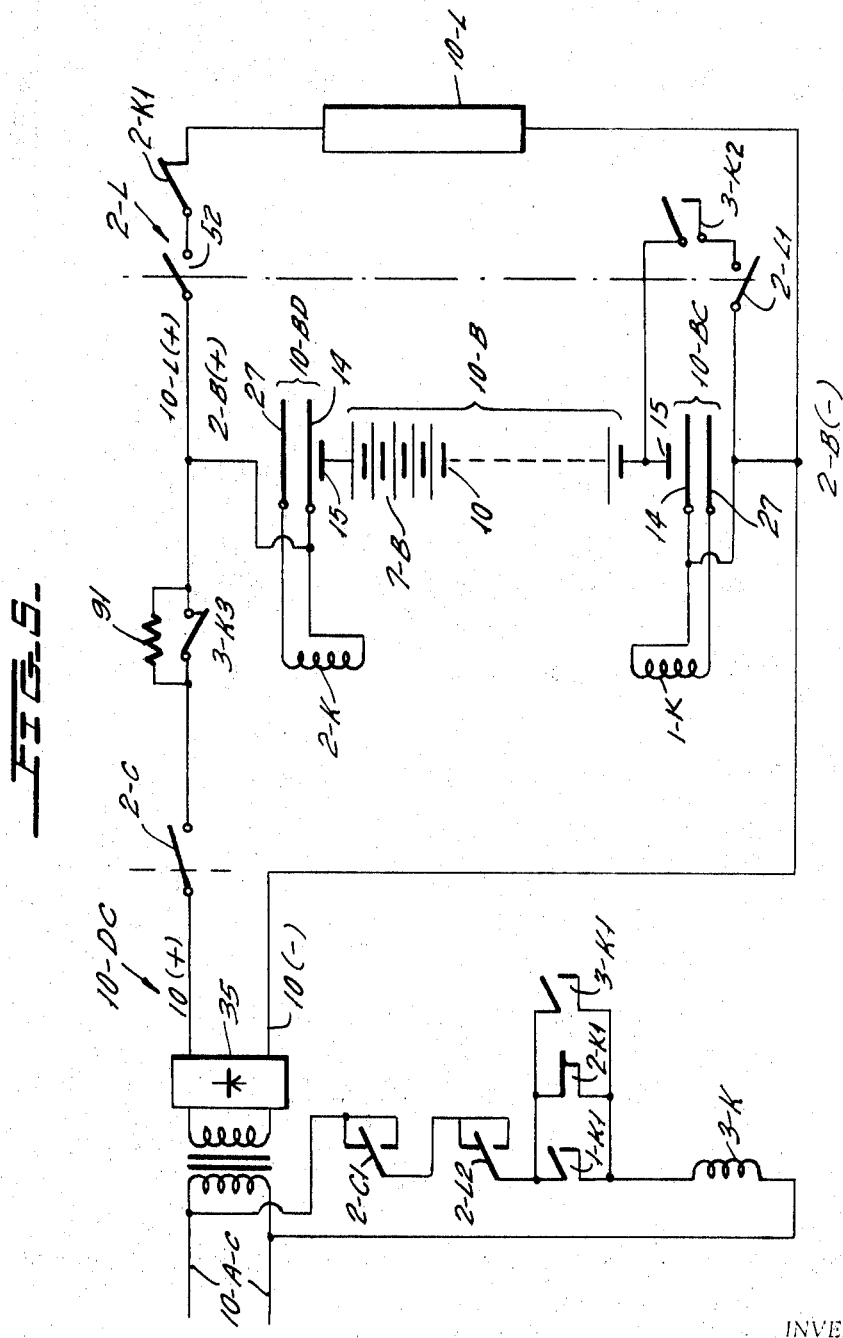

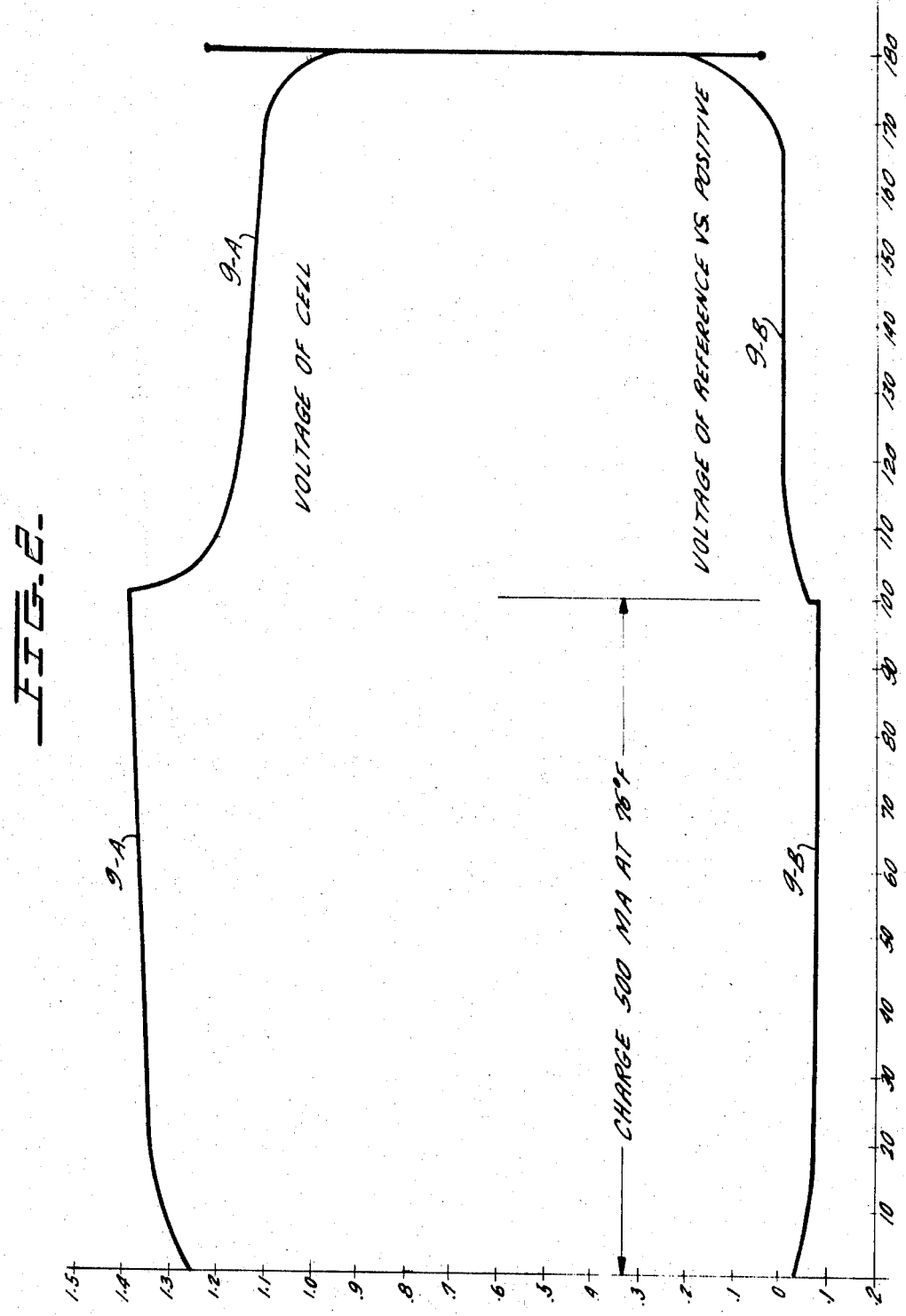

United States Patent Office 3,470,025
Patented Sept. 30, 1969

3,470,025
THIRD-ELECTRODE RECHARGEABLE ALKALINE BATTERY CELLS AND ASSOCIATED BATTERY CIRCUITS
David Yehiely, New York, N.Y., assignor to Sonotone Corporation, Elmsford, N.Y., a corporation of New York
Continuation of application Ser. No. 373,216, June 8, 1964. This application Nov. 8, 1967, Ser. No. 707,885
Int. Cl. H01m 35/32, 43/04, 45/04
U.S. Cl. 136—6                                 5 Claims

ABSTRACT OF THE DISCLOSURE

Apparatus for preventing overdischarging or reverse charging of the lowest capacity cell of a rechargeable battery having a plurality of serially connected sealed cells. A control cell is provided, and is responsive to a voltage rise above a threshold representing a predetermined discharge condition, for reducing the discharge current from the serially connected cells to a safe, damage suppressing level.

---

This invention relates to sealed rechargeable battery cells, and more particularly to such cells operating with alkaline electrolyte and is a continuation of application Ser. No. 373,216, filed June 8, 1964, now abandoned. As examples, they include sealed nickel-cadmium battery cells and sealed nickel-iron cells operating with positive and negative electrodes of the type described in "Storage Batteries" by G. W. Vinal, fourth edition (1955), pages 85–100. In such sealed rechargeable cells, the negative electrode is usually provided with a greater active electrode mass than the positive electrode. However, the invention is also of value in similar vented rechargeable alkaline cells.

In a rechargeable battery having a plurality of serially connected sealed cells, the capacity of the individual cells, although theoretically identical, actually differs from cell to cell. When such charged battery is discharged into a load, the cell of lowest capacity will reach the completely discharged condition while the other battery cells still contain charges and discharge current into the load through such completely discharged cell will overdischarge or charge such lowest capacity cell in reverse direction or with inverted polarity. Such reverse charging of sealed cell with inverted polarity has been long recognized as presenting critical problems. As an example, in case of sealed nickel-cadmium cell—after the discharge has converted all its positive electrode mass of nickel (II) hydroxide $Ni(OH)_2$ has been oxidized to nickel (III) hydroxide (with the negative electrode still containing unreduced cadmium (II) hydroxide $Cd(OH)_2$), further overdischarge or reverse-charging current through such lowest capacity cell causes it to evolve hydrogen gas, which does not or is difficult to recombine within the sealed casing. Such hydrogen gas evolution within a sealed cell casing is dangerous and should be avoided.

United States Patents Nos. 1,016,874 (Edison), 2,104,973 (Dassler) and 3,080,440 (Ruetschi et al.) describe sealed rechargeable cells, wherein the difficulties caused by the evolution of gases is overcome by the use of an auxiliary third cell electrode having platinum or platinum sponge exposed to gases within the sealed cell casing. In order to be effective, the platinum of the third cell electrode must be protected against exposure to electrolyte with a gas pervious antiwetting agent or coating, for instance, of polytetrafluoroethylene (Teflon-type) or perfluorodecanoic acid, or analogous antiwetting compounds of the type described in the articles published in Journal of Colloid Science, vol. 7, October 1952, pages 465–481, by F. Schulman and W. A. Zisman, and in Industrial and Engineering Chemistry, vol. 41, July 1959, pages 829, 830, by D. R. Baer.

In the printed Extended Abstracts, vol. 8, of the Battery Division of the Electrochemical Society, Inc., of the papers presented at the Fall Meeting, Sept. 30, 1963, the Abstract No. 10, pages 32, 33, W. N. Carson, Jr. and J. M. McQuade, describes the use of the voltage developed between such waterproofed gas-exposed third platinum electrode and the negative electrode of a sealed nickel-cadmium or silver battery cell for stopping overcharge thereof. However, such third electrode of a sealed rechargeable cell does not develop a voltage that would be helpful in stopping or suppressing reverse or overdischarging and the resulting evolution of hydrogen gas in the sealed cell casing.

Among the objects of the invention, is a sealed rechargeable alkaline battery cell of the foregoing type having a third auxiliary electrode which in conjunction with another cell electrode and associated control circuit means which respond to reverse charging or overdischarge of the cell to cut-off reverse current charging and suppress damage to such cell.

Another object of the invention is such sealed cell wherein the third auxiliary electrode will remain fully effective when exposed to or holding alkaline electrolyte.

A further object of the invention is such sealed cell with control means connected to the third electrode and responsive to rapid signal rise in its control circuit to cut off or reduce reverse current through the cell to a safe level at which cell damage is suppressed.

A further object of the invention is a battery having a plurality of similar sealed rechargeable cells serially connected in a charging circuit with a similar additional control cell of lesser capacity than the other cells, of the series, with the control cell having an additional third positive electrode and associated circuit means connecting it to the positive cell electrode or electrodes and responsive to signal rise in the third electrode circuit to cut off or reduce the reverse charging current through the control cell and through the other cells to a safe damage-suppressing-level.

Furthermore, a further similar third electrode control cell of the invention is connected with reversed polarity in a fully charge state in series with an above-described multi-cell battery, the cells of which are in a discharged state and are about to be charged. The voltage difference between the third positive and main positive electrode of such further control cell remains low as long as the charging current supplied to the battery does not fully discharge the main positive electrode of such further control cell. However, as soon as the main positive electrode of such further third-electrode control cell is about to become fully discharged by the battery charging current, the voltage difference between the main and third electrode of such further control cell rises rapidly for actuating an associated further control circuit to cut-off or reduce the charging current to a safe level.

The foregoing and other objects of the invention will be best understood from the following description and exemplifications thereof reference being made to the accompanying drawings wherein, FIG. 1 is a cross-sectional and partially diagrammatic view of a rechargeable sealed cell exemplifying one form of the invention;

FIG. 2 is a curve-diagram with characteristic operating curves of a cell exemplifying the invention;

FIG. 3 is a partially cross-sectional and partially diaggrammatic view of a commercial form of a rechargeable sealed cell of the invention;

FIG. 4 is a view similar to FIG. 3 of another metal encased cell exemplifying the invention; and FIG. 5 is a circuit diagram showing one system for utilizing a sealed rechargeable cell of the invention for controlling the discharge of a charged battery in to the load to prevent damage to the battery cells by reversed charging; and also for controlling the charge supplied to such battery and protecting the battery cells against damage by excessive internal gas pressure when recharging the battery under high charging current.

FIG. 1 shows partially in cross-section and partially diagrammatically one form of a sealed alkaline rechargeable cell exemplifying the invention. The specific cells of the invention described herein are of the nickel-cadmium type, although the invention is of value in other types of rechargeable alkaline battery cells, for example, in nickel-iron rechargeable cells. In nickel-cadmium rechargeable cells, the discharged positive electrode mass consists of nickel (II) hydroxide —$Ni(OH)_2$—which when fully charged is converted into nickel (III) hydroxide —$NiO(OH)$—having a nickel in a higher oxidation state. The discharged negative electrode mass of such cell consists of cadmium (II) hydroxide —$Cd(OH)_2$—with when fully charged is converted into metallic cadmium. The invention is applicable to any type of sealed or partially sealed rechargeable nickel cadmium cell including by way of example, those described in United States Patent No. 3,083,249, and in the metal-encased and metal forced vent closure cells described in United States application Ser. No. 343,316 filed Feb. 7, 1964, now abandoned, the disclosures of which are relied upon herein to shorten the description of the distinguishing features of the present invention.

The battery cell 10 of FIG. 1 is generally similar to that described in United States Patent No. 2,708,212, except that the cell casing 11 with its cover 12 form a sealed casing enclosure for the electrode assembly filling the interior casing space. The casing 11 may be of rectangular-horizontal cross section in each of its principal dimensions. The upper end of casing 11 as seen in FIG. 1 is enclosed by a cover wall 12, which is fused or otherwise joined to the surrounding opening wall region of casing 11.

The casing walls 11, 12 are shown as formed of alkali resistant strong plastic material such as nylon. However, it may be made of metal in which case the cover wall is provided with insulating sleeves for insulating the electrodes held therein from each other and from the metallic casing walls.

The electrode assembly of cell 10 of FIG. 1 consists of several pairs of superposed opposite polarity electrode plates separated from each other by porous insulating spacers with the electrode plates and the separator spacers being impregnated with electrolyte for maintaining chemical and electrolytic action between the electrodes when charging and discharging the cell.

The particular cell 10 as shown has three positive plates 14(+) each cooperating with an adjacent negative plate 15(−). The individual adjacent opposite polarity electrode plates 14(+) and 15(−) are separated from each other by porous insulating separators 16. As an example, the electrode assembly may consist of a stack of a sintered and loaded electrode plates of one polarity separated by electrolyte holding separators from similar adjacent opposite polarity electrode plates as described in United States Patent No. 2,527,888 or British Patent No. 214,799 of 1924.

As examples, the battery cell 10 shown may operate with sintered electrode plates loaded with active positive and active negative electrode masses such as described in the Koren et al. Patent No. 2,708,212 or in the article, "Nickel Cadmium Battery Plates," Journal of Electrical Chemical Society, pages 289–299, vol. 94, Dec. 20, 1948. Such batteries operate with an alkaline electrolyte, which may consist, for example, of 20% to 35% potassium hydroxide in water. Unless otherwise specifically stated, all proportions are given herein by weight. As examples, in sealed cells good results are obtained with insulating separators 16 consisting of alkali-resisting fibers such as nylon fibers, matted into a porous liquid absorbing sheet resembling blotting paper, of the type available under the trademark Pellon. In vented cells, good results are obtained with separators consisting of two strong fabric layers, of nylon for example, holding between them an electrolyte pervious alkali-resistant continuous film such as cellophane, of the type disclosed in United States Patent No. 2,696,515 (of Koren et al.).

Insulatingly affixed with a gas tight seal within and sealed through the cell casing cover wall 12 are a positive metallic electrode terminal 21 and a similar negative electrode terminal 25. A plurality of flexible metallic-sheet electrode tabs 22 connect, as by electric welding, the positive electrode plates 14 to the inner end of the positive cell terminal 21. A similar set of electrode tabs 26 connect in a similar way the negative electrode plates 15 to the inner end of the metallic positive cell terminal 25. A strong sheet wrapper 19 of alkaline resistant insulating material, for example of nylon, is wound around the electrode plate assembly before mettallically joining the electrode tabs 22, 26 to the cover cell terminals 21, 25, with the wrapper end affixed as by cement or heat sealing to an underlying wrapper portion.

In practical sealed nickel-cadmium battery cells, good results are obtained by providing the negative electrode with an active electrode mass having at least 20% more capacity than that of the positive electrode plate. Theoretically, best results would be obtained with both the negative and positive electrode mass of a sealed nickel-cadmium battery cell being in fully discharged state when sealing its casing enclosure. However, the cadmium (II) hydroxide of a fully discharged negative cell electrode seems to be of insufficient conductivity and does not establish a good conducting connection with the particles of its sintered electrode plate. To meet this problem, the negative electrode mass of the sealed nickel-cadmium battery cells is given about 10% of its full charge before assembly with the fully discharged positive electrode. The small 10% charge given to the negative electrode mass converts some of its cadmium hydroxide content into metallic cadmium which is very effective in providing a good metallic connection between the large cadmium (II) hydroxide mass and the metallic particles of its sintered electrode plate. The electrode assembly is also impregnated with the alkaline electrolyte before sealing the cell casing.

What was said above about sealed nickel-cadmium battery cell applies also to nickel-cadmium cells of the type disclosed in the now abandoned application of W. R. Vignini, Ser. No. 343,316, filed Feb. 7, 1964, and described below in connection with FIG. 4.

In accordance with the invention, a sealed cell of the type described above is provided with a third or auxiliary positive electrode similar to the positive electrode of the cell and positioned adjacent one of its positive electrodes across an electrolyte holding porous separator or separator space. The cell casing has a third insulated metallic terminal connected through protective circuit means between the main positive electrodes and such third positive electrode and operating in response to a rapid voltage rise therein for protecting the cell against reverse or inverted charging current when its positive electrode mass has been fully discharged while such third electrode cell passes current in the direction of discharged current delivered by it to a load before its positive electrode masses of the main battery cells was fully discharged or have reached zero charge state.

FIG. 1 indicates one manner in which a rechargeable sealed alkaline cell of the type described above may be provided with such third or auxiliary electrode. Next to the positive electrode 14, which at the left side of the encased electrode assembly, is held an additional similar third positive electrode plate 27 connected through a similar connector tab 28 to the inner end of an additional third cell electrode terminal 29 insulatingly sealed through within the casing cover wall 12. Each additional third positive electrode 27 is combined with the other cell electrodes 14, 15 as part of the electrode assembly within the assembly wrapper 19 before the electrode assembly is sealed within the cell casing 11, 12. The additional third electrode 27 is in the same discharge state as the other positive electrode plates 14 of the electrode assembly when it is sealed within the cell casing.

The curves of FIG. 2 show the charging and the discharging characteristics of a sealed cell of the type described above in connection with FIG. 1. In FIG. 2, the abscissa axis indicates time in minutes and the ordinate axis indicates the potential or voltage between the positive and negative electrodes of the cell and between its third electrode and positive electrodes, as the cell is charged from a discharged state to a desired charge state and thereafter discharged. The data represented by the curves of FIG. 2 have been obtained with the sealed cell of 0.75 a.h. (ampere hours) charge capacity, which has been charged with 500 ma. (milliampere) at about 70° C. for 100 minutes and then passed discharging current of 500 ma. for 80 minutes. Curve 9–A shows the voltage difference between the positive and negative cell electrodes 14 and 15, and curve 9–B shows the potential difference between the positive electrodes 14 and third positive electrode 27 during the charging time and the discharging time of the sealed cell as indicated by the abscissa axis.

In FIG. 2, the left part of curve 9–A for zero to 100 minutes on the time axis shows a known characteristic of the voltage difference between the positive and negative electrodes of a sealed nickel-cadmium battery cell as it is being charged from a discharged or zero charge state of its positive electrode (or electrodes) to the fully charged state at the end of the first 100 minutes on the time axis. The right part of curve 9–A from 100 to 180 minutes on the time axis, shows the voltage difference characteristics between the same electrodes as a fully charged cell is discharged to the fully discharged state of its positive electrode (or electrodes) in the subsequent 80 minutes of the cell discharge indicated on the time axis. The curves of FIG. 2 have been obtained with a cell which was charged and discharged with the constant current of 500 ma.

Curve 9–B in FIG. 2 indicates the difference of potential between the third positive electrode 27 and the positive electrode 14 during the above-described charge and discharge periods of the cell. Curve 9–B shows that the voltage difference between the third positive electrode and the main positive electrode of this cell remains very small during charging being about minus .025 volt in the discharged state of the cell and going to minus .075 volt as the voltage between the positive and negative cell electrodes increases from 1.22 to 1.4 volts in the 100 minutes charging time along the time axis. The right part of curve 9–B during the cell discharge between 100 and 180 minutes of the time axis shows that as the cell is discharged, the potential difference between the third electrode and its positive electrode remains very small up to the first 76 minutes of the discharge, being minus .05 volt at the beginning and going to only plus .06 volt after 76 minutes of discharge shortly before the positive electrode reaches its fully discharged state at 180 minutes on the time axis. As the cell discharge continues beyond 176 minutes on the time axis, and the active electrode mass of the main positive electrode is about to reach its fully discharged state after 80 minutes discharge or 180 minutes on the same axis—the potential difference between the third or reference electrode 27(+) of the cell and its positive electrode 14 rises abruptly or at a high rate from near zero voltage to plus 1.25 volts when the positive cell electrode is fully discharged.

In accordance with the invention, the abrupt or high rate voltage rise between the main positive and third positive electrode of such protective cell as the positive electrode reaches its discharged state is utilized from protecting such cell and other serially connected battery cells discharging into a load from being subjected to a reverse charging current when the positive electrode 14(+) with the smallest electrode mass has reached a fully discharged state. A circuit system exemplifying one way for securing such battery protection will be described hereafter in connection with FIG. 5, after first explaining in connection with FIGS. 3 and 4 two other examples of cells exemplifying the invention.

FIG. 3 shows a known type of sealed battery cell of the kind used in critical application, such as space rockets, having a third positive electrode of the present invention. The cell of FIG. 3 is generally similar to the sealed rechargeable cell described and claimed in Belove Patent 3,064,065. It has spirally coiled electrode assembly of superposed positive and negative electrode plates of the type described in Belove Patent 3,083,249. However, the cell of FIG. 3 is modified in accordance with the present invention as explained below.

The cell of FIG. 3 has a tubular metallic casing 51 having a thick metallic top wall 52 and a thick metallic bottom wall 53. The metallic bottom wall 53 has a wall rim which is joined by a gas tight metallic fusion seal to the surrounding edge of the tubular casing 51. The metallic top wall 52 has likewise a wall rim which is joined by a gas tight metallic fusion seal to the surrounding rim of the tubular casing 51.

The metallic housing 51 and its bottom wall 53 form the negative terminal of the cell. Within the metallic cover wall 52 is affixed and sealed through with gas tight fusion seals a metallic positive cell terminal 21–3 and a surrounding insulating sleeve 54. The insulating sleeve 54 may consist of glass and is joined by gas tight fusion seals at elevated temperature to the surrounded metallic terminal 21–3 and to the surrounding wall passage of metallic end wall 52 as described in above referred to Patent 3,064,065. Alternatively, a tubular ceramic insulator 54 having an exterior metallized wall surface joined by gas tight metallic fusion joints to surrounded metallic terminal 21–3 and the surrounding metallic wall passage.

Within the metallic end wall 52 is also similarly affixed and sealed through with a similar gas-tight insulating sleeve 54 and fusion seals a third electrode terminal 29–3 of the cell corresponding to third positive electrode terminal 29 of the FIG. 1 cell.

Within the cell casing 51 is enclosed a spirally coiled electrode assembly consisting of a positive cell electrode 14–1 superposed across porous electrolyte holding separator 16–1 over a similar negative cell electrode plate 1–15(—). Another third positive cell electrode plate 27–1 is superposed across electrolyte holding other separator 16–1 over the main positive cell electrode plate 1–14(+). These three electrodes 14–1, 15–1 and 27–1 may be of any of the known types of sintered electrode plates known or used heretofore in spirally coiled electrode assemblies. In a spirally coiled electrode assembly of the type shown, the interior coiled electrode plate may consist of the negative electrode plate 15–1(—), followed by the next outer positive electrode plate 14–1 and the next outer third positive electrode plate 27–1.

The superposed electrode plates 15–1, 14–1 and 27–1 and their interposed separators 16–1 are spirally wound, for example, around a hollow center sleeve 32 of insulating material into a spirally coiled electrode assembly such as shown and described in Belove Patent 3,083,249.

The superposed main positive and negative, and auxiliary positive plates 14–1, 15–1 and 27–1 have welded thereto flexible metallic electrode tabs 29–1, 26–1 and 28–1, respectively, before assembly. Electrode tab 26–1 from the negative electrode is positioned below the hollow center of the spirally wound electrode assembly and the so-exposed tab end is connected by an electric weld to the underlying portion of the bottom casing wall 53.

An insulating plate 57 which separates the bottom of the electrode assembly from the metallic bottom wall 53, has a slot through which the negative electrode tab 26-1 passes. An insulating plate 58 which separates the upper metallic end wall 52 from the insulating wrapper 19-1 of the underlying electrode assembly has openings through which the two insulated cell terminals 21-3 and 29-3 project. After welding the electrode tabs 29-1 and 28-1 to the inner ends of the metallic cell terminals 21-3, 29-3, the casing end wall 52 is inserted within the surrounding tubular casing 51 and its rim is fusion welded to the surrounding edge of metallic casing.

FIG. 4 shows another type of metal encased rechargeable cell provided with a third electrode in accordance with the invention. The cell of FIG. 4 has a tubular metallic casing 51-1, a metallic cover wall 52-1 and metallic bottom wall 53-1 joined to each other to form a sealed metallic enclosure for the interior cell space. Within the tubular casing is enclosed a spirally coiled electrode assembly having an inner negative electrode plate 15-2, a superposed positive electrode plate 14-2 and an outer adjacent positive third electrode plate 27-2, and interposed porous insulating separators 16-1, all impregnated with and holding alkaline electrolyte.

Metallic cover wall 52-1 has an edge overlapped by an insulating collar 61 forming part of an insulating plate 62 separating the metallic cover from the underlying electrode assembly. A conventional gas-tight insulating joint is formed between the edge of the metallic cover 52-1 and the surrounding junction portion 51-2 of a tubular casing 51-1.

In a similar way, the other metallic casing wall 53-1 is affixed with a gas-tight insulating joint to the surrounding bottom region of tubular casing 51-2.

The positive and negative cell electrodes 14-2, 15-2 and the superposed third positive electrode 27-2, have respective flexible metallic connector tabs 22-2, 26-2 and 28-2 which pass through slits of the upper and lower insulating separators and have their ends metallically, joined as by electric welds to insulated metallic top casing cover 52-1, to tubular metallic casing 51-1 and to insulated metallic bottom casing wall 53-1, respectively. The three mutually insulated casing walls 51-1, 52-1 and 53-1 thus form three exposed cell terminals connected to the two main cell electrode 14-2 and 15-2 and to the third positive electrode 27-2 of coiled electrode assembly within the sealed metallic casing.

As distinguished from sealed rechargeable battery cells, the casing of this cell has a vent opening through which excess pressure gases may escape. However, this casing vent opening (or openings) is (or are) normally held sealed by a metal forced positive vent closure which normally seals the casing enclosure, except that under predetermined internal gas pressure the metal-forced vent closure yields to permit escape of excess pressure gases. A sealed metal casing for a rechargeable battery cell having a vent opening held closed by such metal forced vent closure constitutes the subject matter of now abandoned application Ser. No. 343,316 filed Feb. 6, 1964.

Referring to FIG. 4, the strong metallic casing cover wall 52-1 has an intermediate or central vent opening 73 which is bounded by an opening wall rim 74. A strong outer metallic vent cover wall 81 has a tubular spacer wall 82 with a surrounding rim 83, which is positively affixed to metal cover 52-1 as by electric fusion weld junctions. In the large space volume between vent cover 81 and underlying casing cover wall 52-1 is held elastically compressed a relatively large mass of a nonporous or gas-tight elastomer body 80 having a predetermined volume. The space enclosed by vent cover 81 is large enough to permit the elastomer body 80 to be compressed, so that it bulges into the underlying space of casing vent opening 73 and laterally outward into the wider bottom region space within the surrounding tubular vent cover wall 82. The space within tubular vent cover wall 81 is large enough to permit the compressed elastomer body portions engaging the casing wall region adjoining the casing opening 73 and its upward wall rim to be further bulged laterally outward and upward and be lifted from opening 73 to permit escape of gases through one or more vent passages 85 of vent cover 81 under predetermined level of internal gas pressure within the casing.

Third electrode cells of the present invention based on the principles described above in connection with FIGS. 1 through 4 are unique in—that, when discharging a nickel-cadmium type battery having a plurality of serially connected sealed cells—such cell of the invention enables positive suppression or prevention of reverse charging of any of the battery cells. In addition, by connecting a fully-charged three electrode cell of the invention with reversed polarity in series with a battery having a plurality of serially connected sealed cells which are fully (or almost fully) discharged such reversely connected third electrode cell of the invention enables charging of the battery at high current rate without damage to the battery cells. This is achieved by cutting off the high-rate recharge or reducing it to a trickle charge before the high-rate recharge cause damage by development of high internal gas pressure in the cells of such battery.

FIG. 5 shows how a battery having a plurality of serially connected sealed rechargeable cells is provided with one serially connected third electrode rechargeable cell of the invention for stopping discharge current from the battery into a load before a serially connected cell of such battery of lower capacity than the other cells becomes subject to reverse charging because it first reached a fully discharged state.

Referring to FIG. 5, a battery 10-B having a plurality of serially connected sealed rechargeable cells 7-B is arranged to supply direct-current to a D.C. load 10-L, indicated as resistance load. A load-supply switch 2-L serves to open or close the current supply from the battery 10-B to the load 10-L. An alternating current power supply shown as a power transformer 36 is connected to a rectifier and constant-current supply circuit 35 for supplying through its positive and negative charging supply leads 10(+) and 10(−), respectively, constant charging current for recharging all cells of the battery with constant charging current.

Connected in series with the cells 7-B, of battery 10-B is an additional three electrode cell of the invention 10-BD of the type described above in connection with FIGS. 1 through 4, having main positive and negative electrodes 14 and 15 a third positive electrode 27, connected with the main electrodes in the series circuit with aiding or the same polarity as the other battery cells 7-B. In addition, the opposite side or remote part of the battery 10-B has serially connected with its cells 7-B another similar third electrode battery cell of the invention 10-BC having similar positive and negative electrodes 14, 15 connected with reversed polarity to the other battery cells 7-B and 10-BD, so that as the serially connected battery cells 10-B and 10-BD are charged, cell 10-BC is discharged and vice-versa. Although it is difficult to assure that all cells 7-B of such battery 10-B are identical in capacity, it is simple to select from a plurality of cells for such battery 10-B one or two cells having lower capacity than any other cells of the battery. It should be understood that in sealed cells the positive electrode which is of smaller charge capacity than the negative electrode determines the charging capacity of a given cell. Thus, the two cells 10-BD and 10-BC are selected to have each a smaller charging capacity than the other cells 7-B of the battery 10-B.

In FIG. 5, the bottom electrode 14 of the bottom end cell of battery 10-B constitutes or is connected to the negative terminal 2-B(−) of the battery, and the upper electrode 15 of upper cell 10-BD forms or is connected to the positive electrode 2-B(+) of the battery. Charging current for charging the battery 30 is supplied by a rectifier charging circuit 35 which is supplied with charging energy from an alternating current supply source including a transformer 36 having primary windings connected to an alternating current power supply.

In accordance with the invention, the series connected third electrode cell 10–BD has its positive electrode 14 and its third electrode 27 connected to discharge sensing circuit means 2–K, shown as relay, and responsive to a rise in voltage between its positive and third electrodes 14, 27 to open the battery discharge circuit connection to the load 10–L and stop the discharge or flow of current from the battery 10–B by opening the discharge switch 2–L of the discharge circuit to load 10–L. The other third electrode cell 10–BC, which is connected with reversed polarity in series with the other cells 7–B and and cell 10–BD, serves to stop the flow of charging current into the battery 10–B or reduce it to a trickle charge before the other serially connected cells reach an overcharged condition at which excessive or dangerous internal gas pressure develops within any of the cell casings of the battery.

The charge controlling third electrode cell 10–BC is connected in fully charged state in series with the other sealed cells 7–B and 10–BD, which are all in discharged state corresponding to the fully discharged state of the third electrode discharge control cell 10–BD when charging control cell 10–BC is in fully charged state. Such series connection of the fully-charged third electrode cell 10–BC with the other fully discharged battery cells 7–B and 10–BD assures that when these other cells reach their fully charged state, the charge-controlling third-electrode cell 10–BC will reach its discharged state and develop between its positive electrode 14 and its third electrode 27 a sudden rise of voltage for actuating an associated charge cut off control or relay means 1–K to open the charging circuit at opened contact of relay 3–K for reducing the charging current to a small standby trickling charging current by connecting in the charging circuit a current limiting resistance 91.

Summarizing, the serially connected third electrode cell 10–BD of the multi-cell battery 10–B develops a sudden rise of voltage between its positive electrode 14 and its third electrode 27 when its smaller capacity electrode 14 reaches its fully discharged state and develops in conjunction with its third electrode 27 a sudden rise of voltage for actuating its cut off sensing control means or relay 2–K to an open the battery discharge circuit connection to the load 10–L at switch contacts 2–L.

This third electrode of the other reversely connected third electrode cell 10–BD, which is fully charged when the other serially connected cells 7–B and 10–BD are being charged, and develops a sudden voltage rise between its poistive electrode 14 and its third electrode 47 before the other serially connected cells 7–B reach the fully charged state for actuating its charge cut off sensing means or relay 2–K to open the charging circuit or reduce the charging current to a small trickle charge before further high-current rate charge damages one or more battery cells.

With such battery cell arrangement, on discharging the battery 10–B into the load 10–L, the positive action of third electrode sensing cell 10–BD reaches zero charge state before the positive electrodes of the other serially connected cells 7–B of battery 10–B, causing rapid voltage rise between its positive electrode 14(+) and third electrode 27 thereof and energization of discharge cutoff relay 2–K.

It is assumed that in system of FIG. 5, the various circuit elements are designed, selected and combined with each other as set forth below. All battery cells of battery 10–B and cells 10–BD and 10–BC are sealed cells with a negative electrode of predetermined greater capacity than that of the positive electrode. The state of charge and the capacity of the discharge-controlling cell 10–BD is selected to cause it to become fully discharged before any other cells of battery 10–B and cell 10–BC becomes fully discharged. The state of charge and the capacity of the charge-controlling cell 10–BD, which is connected with reversed polarity relatively to the other cells is selected to become fully charged, when cell 10–BD is fully discharged, this corresponding to the condition of the cells of battery 10–B approaching their fully discharged condition.

As an example, good protection against reverse charging any of the cells of battery 10–B is secured by giving the discharge controlling cell 10–BD about 2% to 5% less capacity than the capacity of any of the other battery cells 7–B. A cell is in fully discharged condition when the positive cell electrode reaches the fully discharged condition, so that further flow of cell current in the same discharge condition (from other serially connected—not yet fully discharged—cells) will cause such cell to be charged in the improper reversed direction. This applies also to a cell, such as shown in FIG. 1, having several pairs of parallel connected opposite-polarity cell electrodes 14(+) and 14(−), respectively.

The charging current supply circuit 35 may be of the type disclosed in the battery charging system of the co-pending application of I. J. Sobel, Ser No. 192,936 filed May 7, 1962, the features of which may be combined with the novel feature of the present invention, and the disclosure of which is relied upon herein. In accordance with the disclosure of said Sobel application, the charging current supply 35 operates under control of battery voltage sensing means to supply constant charging current to all battery cells in response to predetermined small drops of battery voltage of the cell voltage; and to supply a main charge, followed by topping charge—both with constant charging current—in response to the sensing means sensing a predetermined larger drop of battery voltage or cell voltage.

For simplifying the description as to how the third-electrode cells of the present invention operate automatically to protect the serially connected sealed cells 9–B of the battery when discharging into the load 10–L, an open load supply switch 2–L is closed to supply the load 10–L with direct current from the battery 10–B and to open the load circuit. Closure of charging switch 2–C connects the constant direct current supply 35 to the battery 10–B for recharging its serially connected cells.

To charge battery 10–B charging switch 2–C is closed on "on" while load supply switch 2–L is "off" or open. Upon the cells of battery 10–B being discharged cell 10–BD will first reach the fully discharged state, and cause abrupt rise of voltage between its positive and third electrodes 14 and 27 and thereby energize relay 2–K. Operated relay 1–K energizes at its closed contacts 2–K1 the latch relay 3–K which operates and locks itself in operated condition at its locking contacts 3–K1. The operated and locked latch relay 3–K1 shunts charge control cell 10–BC at 3–K2 (with a shunt circuit which may include a resistance); and it opens the main charging current at its opened contacts 3–K3 which connect a resistance in the charging circuit to convert the main battery charge into a trickle charge. To stop trickle charge, charging circuit switch 2–C is opened, which at its momentarily opened contacts 2–C1 deenergizes latch relay 3–K1, which returns to deenergized condition shown.

The sealed discharge-controlling nickel-cadmium battery cell 10–BD has a third positive electrode in addition to its positive nickel (II) hydroxide and its negative cadmium (II) hydroxide electrode and is connected in series with the battery 10–B. The capacity of the main positive electrode of this third-electrode control cell 10–BD is of smaller capacity than that of the positive electrodes of the other serially connected battery cells of battery 10–B.

The winding of relay 2–K, which connects the positive third electrode 27 to the main positive electrode 14 of discharge control cell 10–B, is chosen to constitute a shunt resistance high enough to assure that the major or almost all of the load discharge current of battery 10–B passes through main electrodes 14 and 15 of discharge-control cell 10–BD. As an example, the discharge resistance through main electrodes 14, 15 of cell 10–BD should be of the order 1000 times greater than the resistance of the shunt resistance 2–K between the third and main positive electrodes 14, 27 of cell 10–BD.

It is assumed that after being fully charged, the battery 10–B and its serially connected discharge control cell 10–BD by closure of switch 2–L which opens shunt across 10–BC cell at 2–LS1 the main positive electrode 14 of control cell 10–BD has less charge capacity than the positive electrodes of the other battery cells, it will reach a fully discharge state before the other still discharging battery cells 7–B. The continuing discharge current flow through control cell 10–BD will now polarize the charge-exhausted positive electrode 14 of control cell causing it to present very high resistance to the charging current compared to the shunting resistance 2–K between its positive and third electrodes 14 and 27 of control cell. As a result, the main part of continuing flow of battery discharge current is diverted into the third electrode shunt 2–K. Such third electrode cell shunt resistance relay 2–K which is operated by rising voltage between third electrode 27 and positive electrode 14 of control cell is used to open the battery circuit, shunt its cell out of the discharge circuit and other protective operation of the type described above. As seen in FIG. 5, operated relay 2–K energizes relay 3–K which locks itself and opens the discharge circuit at its opened contacts 3–K2. In a battery protected only by discharge control cell 10–BD, its operated relay 2–K may directly open the discharge circuit by operated contacts corresponding to 3–K2 contacts. Opening of discharge switch 2–L unlocks at its contacts 2–L1 or 2–L2 the relay 3–K, restoring the original circuits.

The specific exemplifications of the invention decribed above will suggest other modifications thereof. It is accordingly desired that the appended claims shall not be limited to such exemplifications of the invention.

The embodiments of the invention in which an exclusive privilege or property is claimed are defined as follows:

1. In an encased rechargeable alkaline-battery control cell for controlling the operation of a plurality of serially connected normally encased alkaline rechargeable cells each having a predetermined charge capacity and only normal main positive and negative electrodes and electrolyte-holding separator space between them, with each normal positive electrode having a positive active mass and the associate normal negative electrode having a negative active mass of greater charge capacity than the associate positive electrode in the discharged cell-state, said control cell comprising at least two associate main electrodes including at least one main positive electrode with a positive active mass and an adjacent negative electrode with a negative electrode mass, each main electrode having an extended overlapping main electrode surfaces with electrolyte-holding separator space between the said overlapping adjacent electrode of said control cell surfaces, said main negative electrodes having greater charge capacity than said associate main positive electrodes in the discharged cell-state, said control cell being subject to charging with reversed polarity by discharge current from other serially-connected cells after the positive mass of said main electrodes is fully discharged, the improvement in combination therewith including control means for suppressing reverse charging through cell circuits including said main electrodes of said control cell, which control means comprise an additional positive electrode having a similar electrode surface and electrolyte-holding separator space thereon overlapping said main electrode surfaces and containing said positive active mass with a charge capacity at most equal to the smallest positive charge capacity of said main cell electrodes, said additional and the main positive electrodes of said control cell having the property of exhibiting a near zero voltage difference between them as long as the positive mass of said main electrodes retains a positive charge while a substantial series current is discharged between said main electrodes and a materially lower fraction of said series current is discharged through a shunt connecting said additional to said main positive cell electrodes causing the positive active mass of said main electrode to become discharged before said additional positive electrode is discharged, and of causing said voltage difference to become materially greater than near zero in response to the positive electrode mass of said main electrodes becoming fully discharged by said series current while said additional electrode retains positive charge.

2. In an encased rechargeable alkaline-battery control cell for controlling the operation of a plurality of serially-connected encased normal alkaline rechargeable cells, each having a predetermined charge capacity and each having only normal main positive and negative electrodes and electrolyte-holding space between said electrodes, each normal positive electrode having a positive active mass and the associate normal negative electrode having a negative active mass of greater charge capacity than the associate positive electrode in the discharged cell-state, said control cell comprising at least two associate main electrodes including one main positive electrode with a positive active mass and an adjacent negative electrode with a negative active mass, said main electrodes having extended overlapping main electrode surfaces with electrolyte-holding separator space between said overlapping surfaces, said main negative electrodes having greater charge capacity than said associate positive electrodes in the discharged cell-state, said control cell being subject to charging with reversed polarity by discharge current from other serially-connected cells after the positive mass of said main electrodes is fully discharged, the improvement in combination therewith including control means for suppressing reverse charging through circuits including said main electrodes of said control cell, which control means comprise an additional positive electrode having a similar electrode surface and electrolyte-holding space thereon overlapping said main electrode of said control cell surfaces and containing said positive active mass with a charge capacity at most equal to the smallest positive charge capacity of said main cell electrodes, shunt elements of predetermined resistance connected between said additional positive and said main positive electrodes of said control cell and causing series current passing between said main electrodes thereof to pass only a materially lower fraction of said series current through said shunt elements and said additional positive electrode, and causing said additional electrode to retain a positive charge when the positive charge of said main electrodes is substantially fully discharged, said additional and the main positive electrodes of said control cell having the property of exhibiting a near zero voltage difference between them as long as the positive mass of said main electrodes retains a positive charge while a substantial series current is discharged between said main electrodes and a materially lower fraction of said series current is discharged through said shunt elements causing the positive active mass of said main electrode to become discharged before said additional positive electrode is discharged, and of causing said voltage difference to become materially greater than near zero in response to the positive electrode mass of said main electrodes becoming fully discharged by said series current while said additional electrode retains positive charge.

3. An alkaline battery having a plurality of serially-connected encased normal rechargeable cells, each of said normal cells having encased only facing normal positive and negative electrodes and electrolyte-holding separator space similar to the main positive and negative electrodes and electrolyte-holding separator space of the control cell as claimed in claim 2, and the combination of said battery with a battery discharge circuit serially connecting said series-connected normal battery cells with said main positive and negative electrodes of the control cell as claimed in claim 2, the positive charge capacity of the main electrodes of said control cell being less than the positive charge capacity and positive charge of one of the said normal cells having the lowest positive charge capacity and said control cell reaching a discharged state before any of said normal cells, and discharge control means forming part of said shunt elements and connected between said additional and main positive electrodes of said control cell and responsive to said material rise of the voltage difference between said additional and main electrodes of said control cell from near zero voltage for suppressing reverse charge current through any of said serially-connected normal cells.

4. An alkaline battery having a plurality of serially-connected encased normal rechargeable cells, each of said normal cells having encased only facing normal positive and negative electrodes and electrolyte-holding separator spaces similar to the main positive and negative electrodes and electrolyte-holding separator space of the control cell, as claimed in claim 2, a series charging circuit connected to said serially-connected normal cells for recharging the same, said normal cells tending to develop excessive internal gas pressure under excess charging current between their said normal positive and negative electrodes, and in combination with said charging circuit of a control cell as claimed in claim 2 having its said main positive and negative electrodes connected with reversed polarity in series with said serially-connected normal cells, said further control cell being fully charged when said serially-connected normal cells are fully discharged, the positive charge capacity of said further control cell reaching zero charge state when charging current through said charging circuit restores full charge to said serially-connected normal cells, and charge control means connected between said further main and further additional positive electrodes of said further control cell and responsive to said material rise of the voltage difference from near zero voltage between said further additional and main positive electrodes of said further control cell for at least materially reducing the charging current to said normal cells.

5. An alkaline battery having a plurality of serially-connected encased normal rechargeable cells, each of said normal cells having encased only facing normal positive and negative electrodes and electrolyte-holding separator space similar to the main positive and negative electrodes and separator space of the control cell as claimed in claim 2, and the combination of said battery with a battery discharge circuit serially connecting said series-connected normal battery cells with said main positive and negative electrodes of the control cell as claimed in claim 2, the positive charge capacity of the main electrodes of said control cell being less and containing a lesser positive charge than the positive charge and the charge capacity of one of the said normal cells having the lowest positive charge capacity and said control cell reaching a discharged state before any of said normal cells, and discharge control means forming part of said shunt elements and connected between said additional and main electrodes of said control cell and responsive to said material rise of the voltage difference between said additional and main electrodes of said control cell from near zero voltage for suppressing reverse charge current through any of said serially-connected normal cells, and the further combination of said battery with a series charging circuit connected to said serially-connected normal cells for recharging the same, said charging circuit comprising a serially-connected further control cell as claimed in claim 2, having corresponding further main positive and negative electrodes and a further additional positive electrode with said further main positive and negative electrodes thereof connected with reverse polarity with said main cells, said further control cell being fully charged when said serially-connected normal cells are fully discharged, said main positive mass of said further control cell reaching zero charge state when said charging current through said charging circuit restores full charge to said serially-connected normal cells, and charge control means connected between said further additional main and positive electrodes of said further control cell and responsive to said material rise of the voltage difference from near zero voltage between said further additional and main positive electrodes of said further control cell for at least materially reducing the charging current to said normal cells.

References Cited

UNITED STATES PATENTS

| | | | |
|---|---|---|---|
| 2,857,447 | 10/1958 | Lindstrom | 136—6 X |
| 3,080,440 | 3/1963 | Ruetschi | 135—6 X |
| 3,081,366 | 3/1963 | Belove | 136 |
| 3,089,913 | 5/1963 | Garten et al. | 136—24 |
| 3,208,880 | 9/1965 | Bode | 136—24 |

WINSTON A. DOUGLAS, Primary Examiner

A. SKAPARS, Assistant Examiner